United States Patent [19]
Burgess

[11] 3,891,107
[45] June 24, 1975

[54] STRADDLE CARRIER LIFTING MEANS
[75] Inventor: Glen W. Burgess, Battle Creek, Mich.
[73] Assignee: Clark Equipment Company, Buchanan, Mich.
[22] Filed: June 20, 1974
[21] Appl. No.: 481,021

[52] U.S. Cl.............................. 214/392; 254/124
[51] Int. Cl............................................. B60p 3/00
[58] Field of Search................... 214/390, 392, 396; 254/124, 126, 144; 74/519, 242.8

[56] References Cited
UNITED STATES PATENTS
2,862,635   12/1958   Christenson et al................ 214/392

FOREIGN PATENTS OR APPLICATIONS
1,028,260   5/1966   United Kingdom................. 214/392

Primary Examiner—Albert J. Makay
Attorney, Agent, or Firm—John C. Wiessler

[57] ABSTRACT

A straddle carrier in which each of a pair of parallel load hooks operative in the bay of the carrier is actuated to lift a load by a single hydraulic cylinder jack actuating a single bell crank, opposite ends of the bell crank being connected by separately reeved chains and sprockets to opposite ends of the load hook.

2 Claims, 3 Drawing Figures

STRADDLE CARRIER LIFTING MEANS

SUMMARY

This invention relates to a straddle carrier and more particularly to a lifting device for the load hooks thereof.

It is a primary object of the invention to provide a simplified lifting device for straddle carriers.

Other objects and advantages will appear from the description taken in conjunction with the accompanying drawings.

DESCRIPTION OF THE PREFERRED EMBODIMENT

Figure 1:
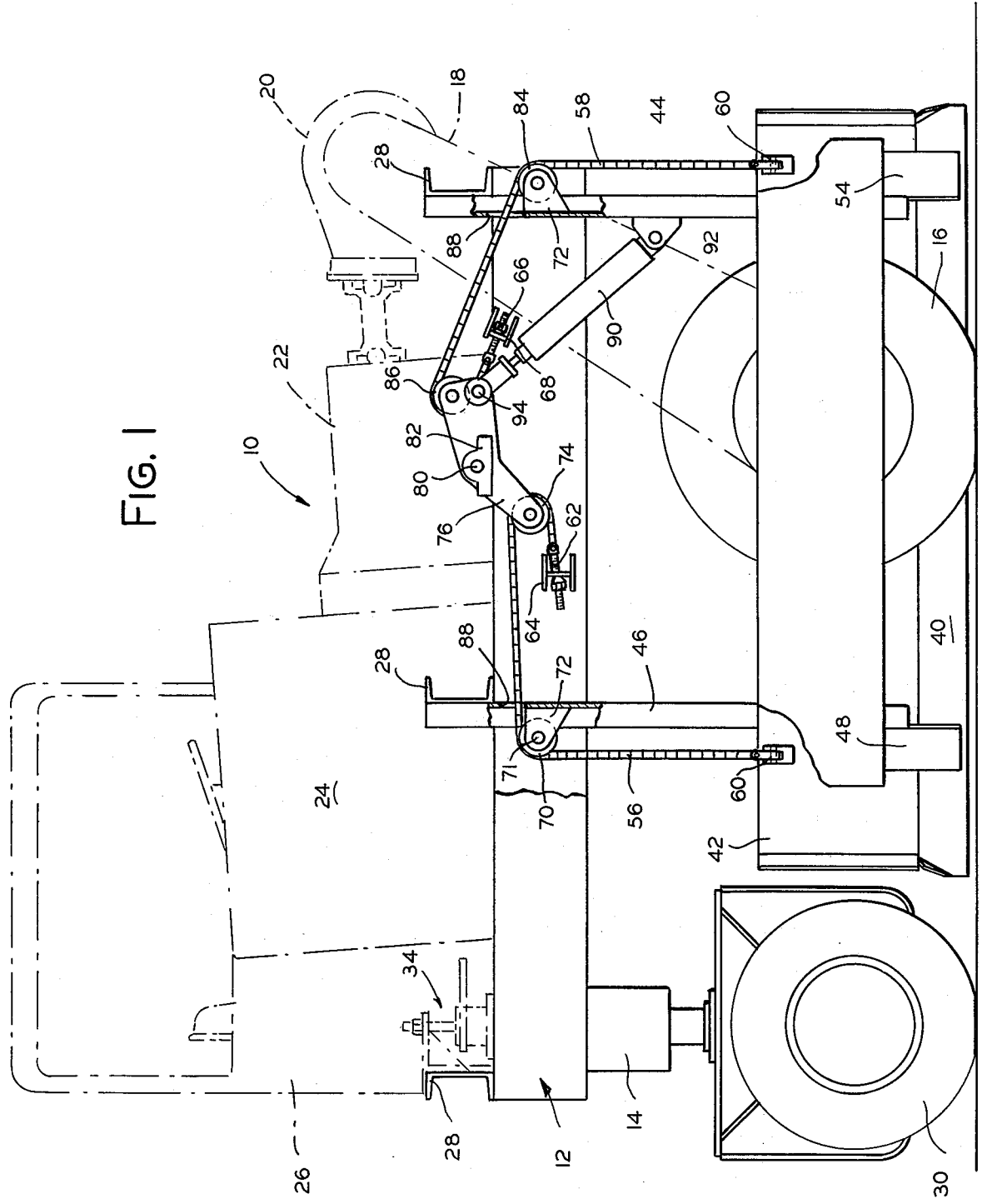
FIG. 1 is a side view of a straddle carrier shown partially in phantom and partially broken away to show my lifting device.
Figure 2:
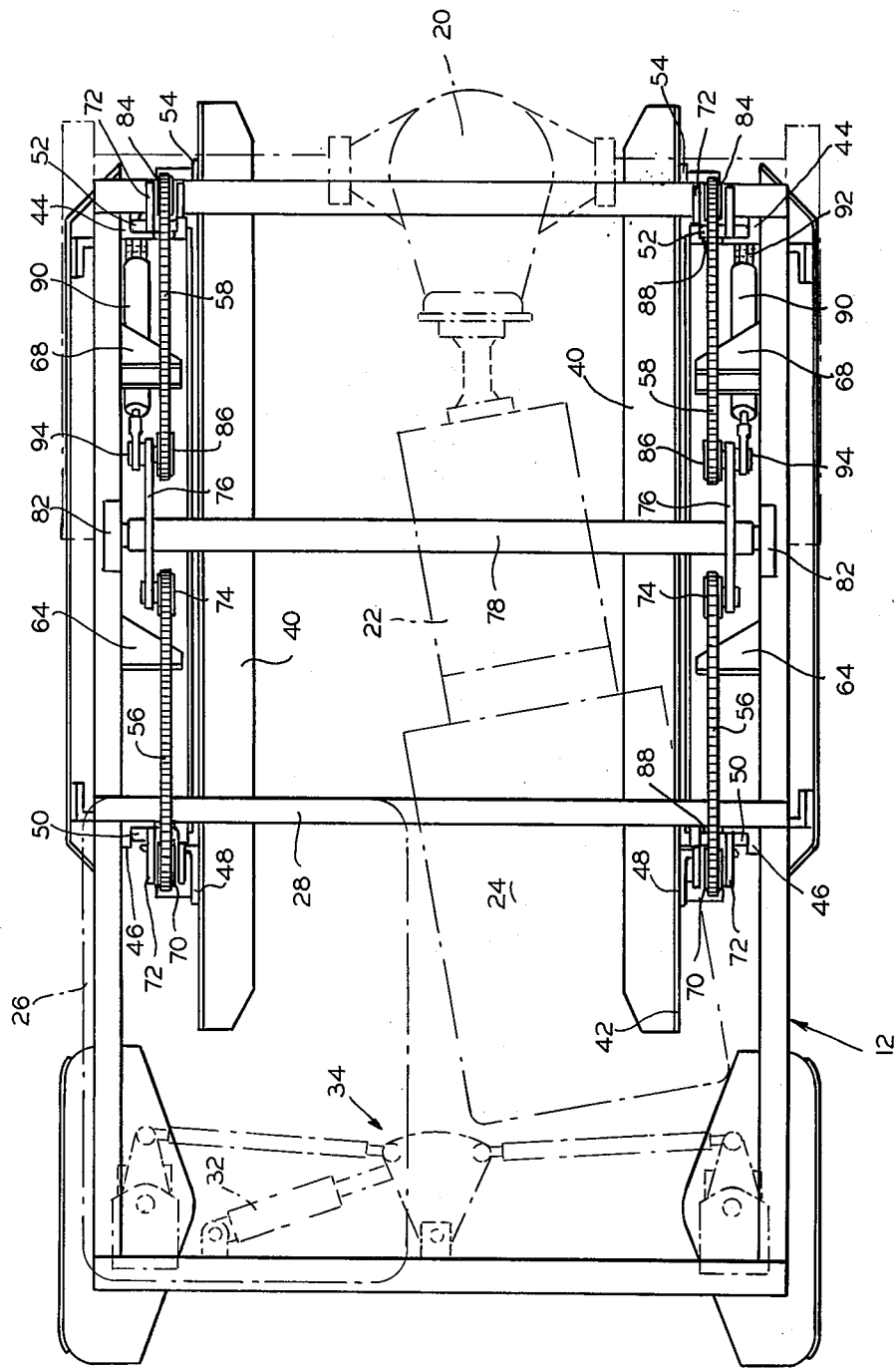
FIG. 2 is a plan view of the carrier shown in FIG. 1.
Figure 3:
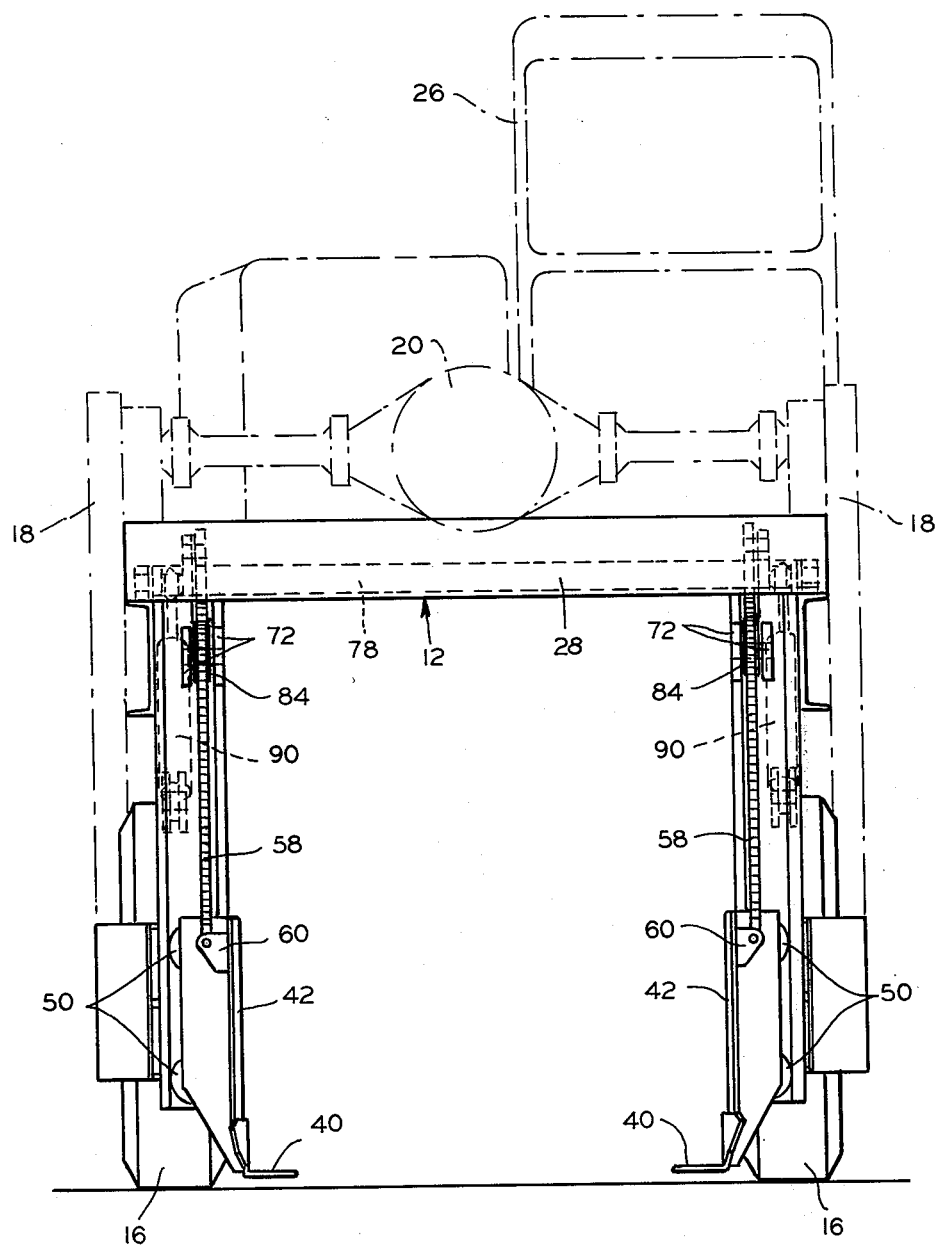
FIG. 3 is a forward end view of FIG. 1.

Referring in detail to the drawings, a straddle carrier vehicle is shown generally at numeral 10, so named because it straddles a load to carry it in a bay formed within the generally inverted U-shaped frame of the vehicle. The vehicle in general comprises a rectangular upper main frame 12 having wheels supported from fork tube housings 14 at each corner thereof, the front two wheels 16 of which are driven by a pair of drive chains mounted within safety shrouds 18 which are driven by a differential axle assembly 20 of a power train shown in phantom view which includes a transmission 22 and an engine 24, all supported from the upper carrier frame. An operator's cab is shown at numeral 26, also supported suitably from the upper frame. Transverse support and strengthening channels are shown at numeral 28. A pair of steer wheels 30 are steered from the operator's compartment and a power steering system which includes a power cylinder 32 and a steering linkage assembly as shown generally at 34 in FIG. 2. The carrier structure as described above is conventional.

My invention is directed to the lifting device for a pair of longitudinally extending and transversely spaced elevatable load hooks 40, each of which has a vertical longitudinally extending side 42 mounted for guided support and elevation in a pair of front and rear facing channel members 44 and 46 by means of pairs of rollers 50 and 52 mounted in channels 44 and 46 and connected to adjacent portions of each side 42 by a pair of angle irons 48. Each angle iron is secured along its one side, as by welding, to the adjacent portion of a side plate 42, the rollers 50 and 52 being mounted from the other side of each angle iron. Pairs of channel members 44 and 46 are secured both to the side frame members of the carrier and to cross frame members 28, while being structurally connected together in the downwardly extending portions thereof by the load hooks 40 as above described.

A pair of lifting chains or cables 56 and 58 are secured to opposite end portions of each load hook at swivel anchor assemblies 60 and to the adjacent side frame member at anchor assemblies 62 and 66, respectively, the anchors being mounted from bifurcated side frame mounted brackets 64 and 68. Each chain or cable 56 is reeved between anchors 60 and 62 by way of sprocket sheave wheels 70 and 74. Wheel 70 is mounted for rotation on a shaft pin 71 in a bifurcated bracket 72, the sides of which are welded to the web and leg portions, respectively, of channel 46. Each wheel 74 is mounted for rotation at the end of the one arm of each bell crank 76. The bell crank is secured, as by welding, to one end portion of a torque tube 78 which is mounted at its opposite ends for rotation on pins 80 which are supported in brackets 82, said brackets being secured to the upper edge of the respective side frame members of frame 12. Each chain or cable 58 is reeved similarly between anchors 60 and 66 by way of a pair of sprocket or sheave wheels 84 and 86, the wheel 84 being secured in each instance by a bifurcated bracket 72 to channel 44, and wheel 86 being mounted for rotation at the end of the other leg of each bell crank 76. Each chain or cable 56 and 58 passes through an opening 88 formed in the web of each channel member 44 and 46.

A single acting relatively short stroke hydraulic cylinder assembly 90 is mounted for pivotal movement at each side of the carrier by means of a bracket and pivot pin 92 which connects the base end of the cylinder to the adjacent channel 44, and a pin 94 which connects the rod end pivotally to a projecting portion of the one leg of each bell crank. The torque tube 78 functions in known manner to connect together the bell cranks 76 on opposite sides of the carrier for synchronizing the elevating movement of the load hooks in the event one tends to advance ahead of the other during lifting movement by transferring torque forces to the load hook which tends to lag.

In operation, the carrier vehicle is driven by the operator into a straddling relation with a palletized load to be engaged, the horizontal platforms of the load hooks engaging beneath the opposite sides of the load, and then being actuated together by the pair of cylinders 90 which elevate the load hooks on pairs of rollers 50 and 52 in the respective vertical channel members. The single actuator cylinder at each side of the carrier during extension causes the bell crank 76 connected thereto to be rotated with torque tube 78 in brackets 82 on shaft pins 80 so as to simultaneously actuate the respective pairs of chains 56 and 58 at a 2:1 ratio on pairs of sprockets 70, 74 and 84, 86, respectively, within the available range of elevation of the load hooks. The sides of the load are supported by the vertical plate portions 42 of the load hooks. The load is lowered by gravity upon release of fluid pressure in the cylinders 90, the rate of descent being controlled by operator valve means. The hydraulic control system is not a part of the present invention, and so has not been disclosed herein. The load hooks are raised and lowered both synchronously and in the same plane as a result of the method of reeving chains 56 and 58 on the opposite ends of the respective bell crank arms. Thus, it will be appreciated that I have provided an extremely simple and straightforward lifting structure for operating straddle carrier load hooks.

It will be apparent to those skilled in the art that various changes in the structure and relative arrangement of parts may be made without necessarily departing from the scope of my invention.

I claim:

1. In a straddle carrier having a pair of load hooks located at opposite sides in the bay thereof, means for lifting at least one of said load hooks which comprises a single bell crank mounted for pivotal movement from one side of the carrier at a location above and intermediate the ends of said load hook, first sheave or sprocket wheel means mounted at each end of the bell crank, second sheave or sprocket wheel means mounted from said one side of the carrier above each end portion of said load hook, first and second cable or chain means each secured to the one side of the carrier and to the respective end of the one load hook and reeved on said first and second sheave or sprocket wheel means, and a single actuator cylinder connected to the one side of the carrier and to one end portion of the bell crank for actuating the bell crank and cables or chains on said sheave or sprocket wheel means for lifting the one load hook.

2. A straddle carrier as claimed in claim 1 wherein such means for lifting the other said load hook is located on the other side of the straddle carrier and is mounted thereon and connected to said other load hook in the same manner as is the first said lifting means, and cross shaft means connecting together the bell cranks on opposite sides of the carrier for synchronizing the lifting action of the respective lifting means.

* * * * *